(12) United States Patent
Torng et al.

(10) Patent No.: US 6,447,689 B1
(45) Date of Patent: Sep. 10, 2002

(54) PROTECTIVE LAYER FOR CONTINUOUS GMR DESIGN USING REVERSE PHOTO MASK

(75) Inventors: Chyu-Jiuh Torng, Pleasanton; Chen-Jung Chien, Sunnyvale; Kochan Ju, Fremont; Jei-Wei Chang, Cupertino, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 179 days.

(21) Appl. No.: 09/584,424

(22) Filed: Jun. 5, 2000

(51) Int. Cl.[7] .................................................. G11B 5/39
(52) U.S. Cl. .............................. 216/22; 216/40; 216/47; 360/113; 360/324 R; 360/327.31
(58) Field of Search ................... 216/22; 360/324.12, 360/113; 205/118; 430/5

(56) References Cited

U.S. PATENT DOCUMENTS

| | | | |
|---|---|---|---|
| 5,491,600 A | 2/1996 | Chen et al. | 360/113 |
| 5,731,936 A | 3/1998 | Lee et al. | 360/113 |
| 5,883,764 A * | 3/1999 | Pinarbasi | 360/113 |
| 5,985,162 A | 11/1999 | Han et al. | 216/22 |
| 6,030,753 A * | 2/2000 | Lin | 430/314 |
| 6,218,056 B1 * | 4/2001 | Pinarbasi et al. | 430/5 |
| 6,228,276 B1 * | 5/2001 | Ju et al. | 216/22 |
| 6,274,025 B1 * | 8/2001 | Chang et al. | 205/118 |
| 6,278,592 B1 * | 8/2001 | Xue et al. | 360/324.12 |
| 6,278,595 B1 * | 8/2001 | Xue et al. | 360/327.31 |

OTHER PUBLICATIONS

Wilson, W.L. —A Sensitive Magnetoresistive MEMS acoustic Sensor—Rice University—Final Report Contract 961004.*

* cited by examiner

Primary Examiner—Randy Gulakowski
Assistant Examiner—Gentle E Winter
(74) Attorney, Agent, or Firm—George O. Saile; Stephen B. Ackerman

(57) ABSTRACT

An improved process for manufacturing a spin valve structure that has buried leads is disclosed. A key feature is the inclusion in the process of a temporary protective layer over the seed layer on which the spin valve structure will be grown. This protective layer is in place at the time that photoresist (used to define the location of the spin valve relative to the buried leads and longitudinal bias layers) is removed. The protective layer is later removed as a natural byproduct of surface cleanup just prior to the formation of the spin valve itself.

20 Claims, 4 Drawing Sheets

PROTECTIVE LAYER FOR CONTINUOUS GMR DESIGN USING REVERSE PHOTO MASK

This application is related to attorney docket number HT99-025, Ser. No. 09/584,426 filed on Jun. 5, 2000, assigned to a common assignee.

FIELD OF THE INVENTION

The invention relates to the general field of GMR read heads for magnetic disk systems with particular reference to use of buried leads and photoresist processes therwith.

BACKGROUND OF THE INVENTION

Read-write heads for magnetic disk systems have undergone substantial development during the last few years. In particular, older systems in which a single device was used for both reading and writing, have given way to configurations in which the two functions are performed by different structures. The magnetic field that 'writes' a bit at the surface of a recording medium is generated by a flat coil whose magnetic flux is concentrated within two pole pieces that are separated by a small gap (the write gap). Thus, most of the magnetic flux generated by the flat coil passes across this gap with peripheral fields extending out for a short distance where the field is still powerful enough to magnetize a small portion of the recoding medium.

The present invention is concerned with the manufacture of the read element. This is a thin slice of material located between two magnetic shields, one of which is also one of the two pole pieces mentioned above. The principle governing operation of the read sensor is the change of resistivity of certain materials in the presence of a magnetic field (magneto-resistance). In particular, most magnetic materials exhibit anisotropic behavior in that they have a preferred direction along which they are most easily magnetized (known as the easy axis). The magneto-resistance effect manifests itself as a decrease in resistivity when the material is magnetized in a direction perpendicular to the easy axis, said decrease being reduced to zero when magnetization is along the easy axis. Thus, any magnetic field that changes the direction of magnetization in a magneto-resistive material can be detected as a change in resistance.

It is now known that the magneto-resistance effect can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are, in addition to a seed layer and a cap layer, two magnetic layers separated by a non-magnetic layer. The thickness of the non magnetic layer is chosen so that the magnetic layers are sufficiently far apart for exchange effects to be negligible (the layers do not influence each other's magnetic behavior at the atomic level) but are dose enough to be within the mean free path of conduction electrons in the material. If, now, layers of these two magnetic layers are magnetized in opposite directions and a current is passed through them along the direction of magnetization, half the electrons in each layer will be subject to increased scattering while half will be unaffected (to a first approximation). Furthermore, only the unaffected electrons will have mean free paths long enough for them to have a high probability of crossing the non magnetic layer. However, once these electron 'switch sides', they are immediately subject to increased scattering, thereby becoming unlikely to return to their original side, the overall result being a significant increase in the resistance of the entire structure.

In order to make use of the GMR effect, the direction of magnetization of one the layers must be permanently fixed, or pinned. Pinning is achieved by first magnetizing the layer (by depositing and/or annealing it in the presence of a magnetic field) and then permanently maintaining the magnetization by over coating with a layer of antiferromagnetic material. The other layer, by contrast, is a "free layer" whose direction of magnetization can be readily changed by an external field (such as that associated with a bit at the surface of a magnetic disk).

On Feb. 5, 1999, application Ser. No. 09,244,882, entitled "Magnetoresistive (MR) sensor element with sunken lead structure" was filed with the U.S. Patent Office. This document discloses a structure similar to the one shown in FIG. 1. Shown there is a substrate 11 (usually a dielectric material such as aluminum oxide) on whose upper surface is a seed layer 12. GMR sensor 15 has been grown over seed layer 12 and contact to this GMR layer is made through buried lead structure 13'. This generally has the shape of a pair of stripes separated by seed layer 12. It may comprise a single material or a laminate of several materials.

Leads 13' have been deposited onto seed layer 12 and then overcoated with a pair of longitudinal bias stripes 14'. The latter are made of a suitable magnetic material and, in the finished device, are permanently magnetized in a direction parallel to the surface of seed layer 12. Their purpose is to prevent the formation of multiple magnetic domains in the free layer portion of the GMR sensor, particularly near its ends.

While the structure shown in FIG. 1 has proven to be an effective package for a GMR sensor and its leads, early versions of said structure were found to exhibit lower than expected GMR ratios. The cause of this problem was found to be the presence of an oxide layer at the interface between layers 15 and 12. The present invention is directed to finding a solution to this problem A routine search of the prior art was performed but no references that describe the solution disclosed in the present invention were encountered. Several references of interest were found, however. For example in U.S. Pat. No. 5,985, 162, Han et al. show conductive lead process using a PMGI/PR bilayer structure. Chen et al. (U.S. Pat. No. 5,491,600) and Pinarbasi (U.S. Pat. No. 5,883,764) show other conductive lead processes/ etches using a PMGI/PR bilayer structure while Lee et al. (U.S. Pat. No. 5,731,936) show a seed layer for a MR.

SUMMARY OF THE INVENTION

It has been an object of the present invention to provide an improved process for the manufacture of a sensing element for a magnetic disk system.

Another object of the invention has been that said sensing element be based on the GMR effect and have buried leads.

A further object has been that said process utilize reverse photoresist masking.

These objects have been achieved by including in the process deposition of a protective layer over the seed layer on which the spin valve structure will be grown. This protective layer is in place at the time that photoresist (used to define the location of the spin valve relative to the buried leads and longitudinal bias layers) is removed. The protective layer is removed as a natural byproduct of surface cleanup just prior to the formation of the spin valve itself.

DESCRIPTION OF THE PREFERRED EMBODIMENTS

We disclose two embodiments of the process of the present invention.

First Embodiment

Figure 2:
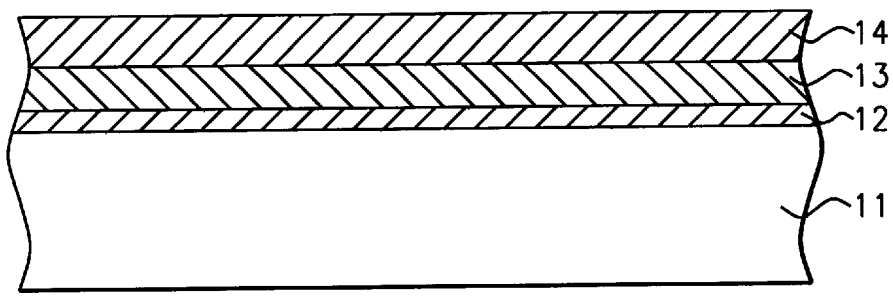
FIG. 2 shows the starting point of the process of a first embodiment of the present invention.

Referring now to FIG. 2, the process of the first embodiment of the present invention begins with the deposition onto substrate 11 of seed layer 12. The material for seed layer could be tantalum, nickel-chromium, nickel-iron-chromium, or zirconium and it is deposited to a thickness between about 10 and 200 Angstroms. With the seed layer in place, blanket layers 13 (buried leads) and 14 (longitudinal bias providers) are deposited to thicknesses between about 100 and 1,500 Angstroms and between about 50 and 650 Angstroms, respectively.

Figure 3:
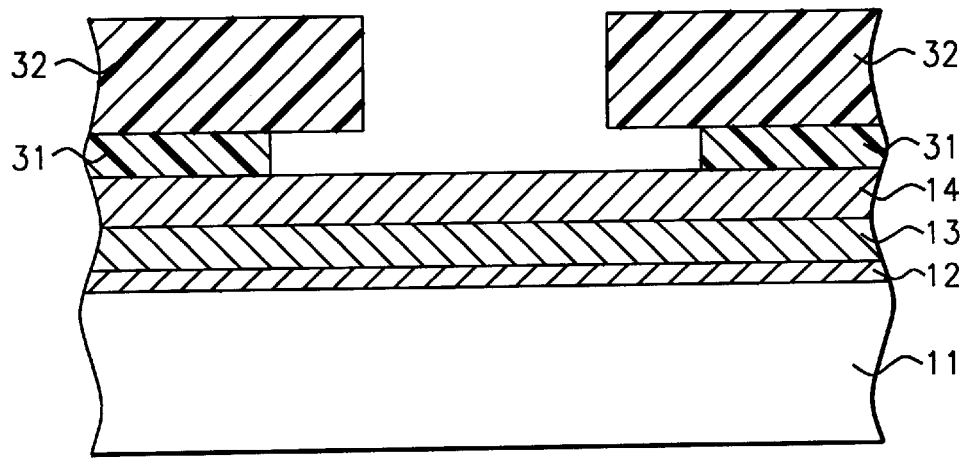
FIG. 3 illustrates the placement of a liftoff mask on the surface of the structure seen in FIG. 2.

Next, as seen in FIG. 3, a liftoff mask is formed on the longitudinal bias layer 14. Said mask consists of a lower portion 31, made of a soluble resin such as poly dimethylglutarimide (PMGI) that may be patterned in the same way as conventional photoresist but that can be easily dissolved in any basic solvent having a pH in excess of 0.5 such as KOH. and an upper portion 32, made of a photoresist material. The upper portion 32 uniformly overlaps lower portion 31 by a certain amount.

Figure 4:
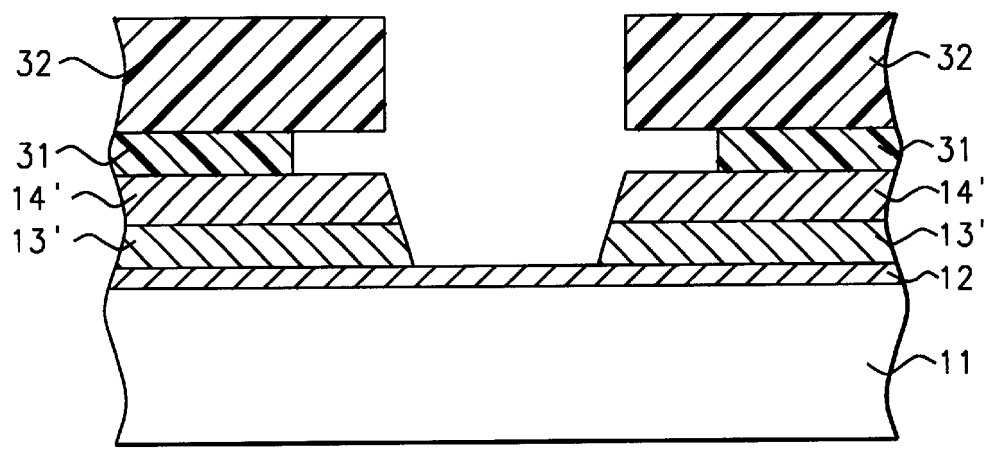
FIG. 4 illustrates the structure of FIG. 3 after etching to expose the seed layer.
Figure 5:
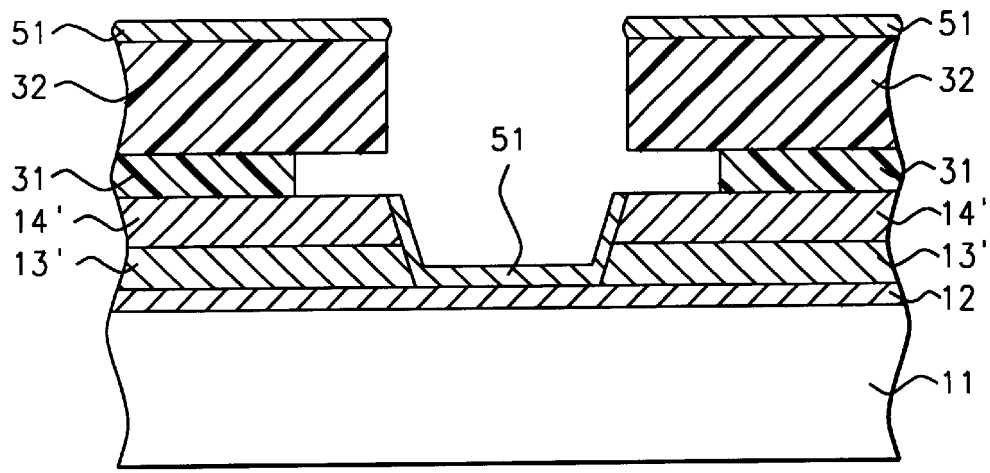
FIG. 5 shows the structure of FIG. 4 after a protective layer has been deposited over the seed layer.

With the mask in place, all areas of the longitudinal bias and buried lead layers that are not directly beneath upper portion 32, are removed, as shown in FIG. 4, leaving behind layers 13' and 14' and exposing seed layer 12. Then, as illustrated in FIG. 5, in a departure from our own previous practice as well as from the known prior art, protective layer 51 of a non-magnetic material is deposited onto seed layer 12 as well as the sidewalls of layers 13' and 14'. This protective layer is required to have certain properties. These include:

(a) a high sputtering yield so that it may be removed more rapidly than surrounding material, thereby eliminating any need to mask surrounding material during its later removal (b) it should form an oxide that is readily soluble in ammonium persulfate or ammonium hydroxide so that any oxide that should happen to form during processing can be readily removed.

(c) it should have a crystal structure similar to that of the seed layer so that if some of it should be left behind, inadvertently or intentionally (see below), proper seeding of the next layer will still occur.

Our preferred choice for the protective layer has been copper but other materials such as gold, platinum, silver, or palladium could have been used. The protective layer is deposited to a thickness between about 20 and 150 Angstroms.

After deposition of protective layer 51, liftoff of the mask is effected. This is accomplished by applying a suitable solvent such as NMP to the structure in order to dissolve lower mask portion 31 allowing upper mask portion 32 to be easily washed away along with all material adhering to 32. It is during this step that the presence of the protective layer is essential since, without it, oxidation of seed layer 12 is liable to occur.

Figure 6:
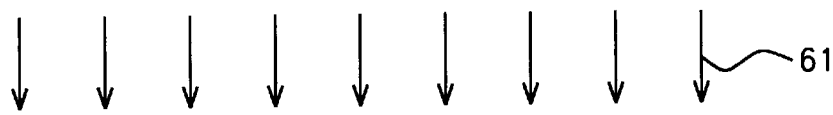
FIG. 6 shows the structure of FIG. 5 after sputter cleaning has been used to remove all or most of the protective layer.
Figure 6:
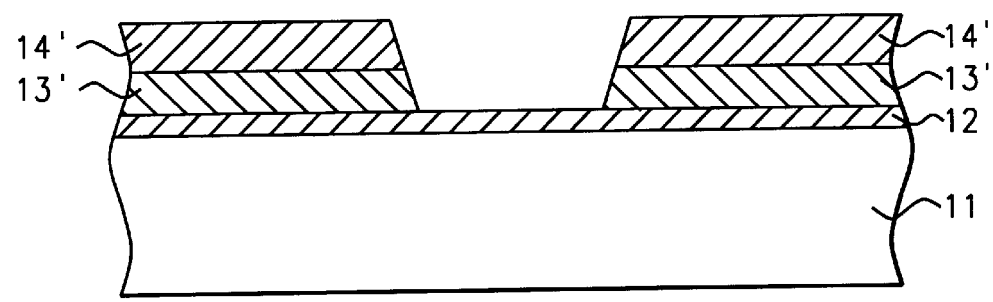

Once all masking material has been removed, the structure is subjected to sputter cleaning, symbolized by ion stream 61 in FIG. 6. Sputter cleaning may be carried on for long enough to completely remove protective layer 51 or a small amount of it (less than about 30 Angstroms) may be left behind. If the latter option is chosen it is particularly important that protective layer 51 and seed layer 12 have similar crystal structures (lattice constants within ±0.5 Angstroms of each other). FIG. 6 illustrates the structure after the protective layer has been fully removed.

Figure 1:
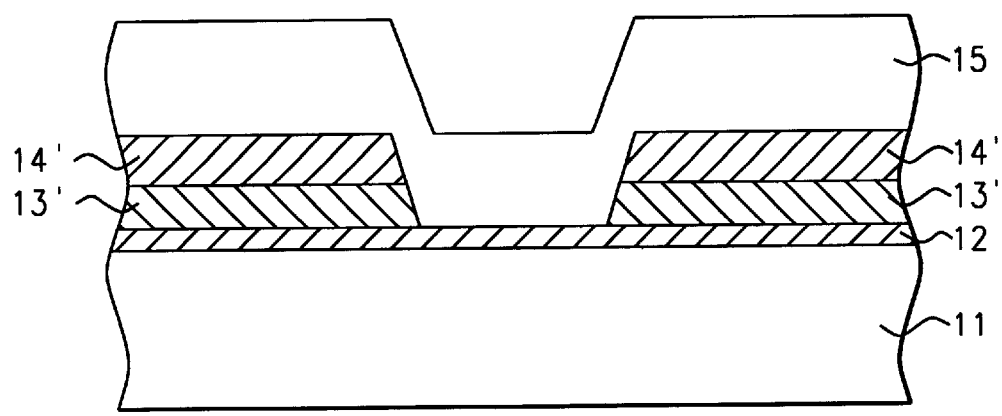
FIG. 1 is a schematic cross-section of the structure whose performance is to be improved through the process of the present invention.

The process of the first embodiment of the present invention essentially ends when the structure of FIG. 6 has been achieved. In practice, of course, processing would continue with the formation of a spin valve structure on the exposed seed layer in order to form the structure that was shown in FIG. 1.

Second Embodiment

Figure 7:
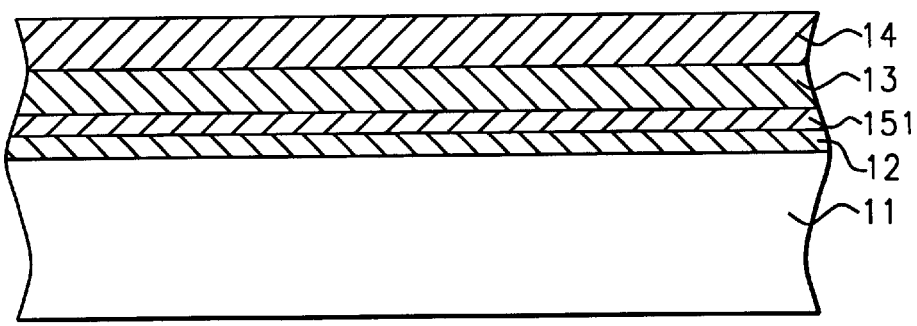
FIG. 7 shows the starting point of the process for a second embodiment of the present invention.

Referring now to FIG. 7, the process of the second embodiment of the present invention begins with the deposition onto substrate 11 of seed layer 12. The material for seed layer 12 could be tantalum, nickel-chromium, nickel-iron-chromium, or zirconium and it is deposited to a thickness between about 10 and 200 Angstroms. This is followed, as quickly as possible, with the deposition of protective layer 151, to a thickness between about 10 and 150 Angstroms. As in the first embodiment, the protective layer should have a high sputtering yield, it should form an oxide that is readily soluble, and it should have a crystal structure similar to that of the seed layer. Our preferred choice for the protective layer has been copper but other materials such as gold, platinum, silver, or palladium could have been used. The protective layer is deposited to a thickness between about 10 and 150 Angstroms.

With protective layer 151 in place, blanket layers 13 (buried leads) and 14 (longitudinal bias providers) are deposited to thicknesses between about 100 and 1,500 Angstroms and between about 50 and 650 Angstroms, respectively.

Figure 8:
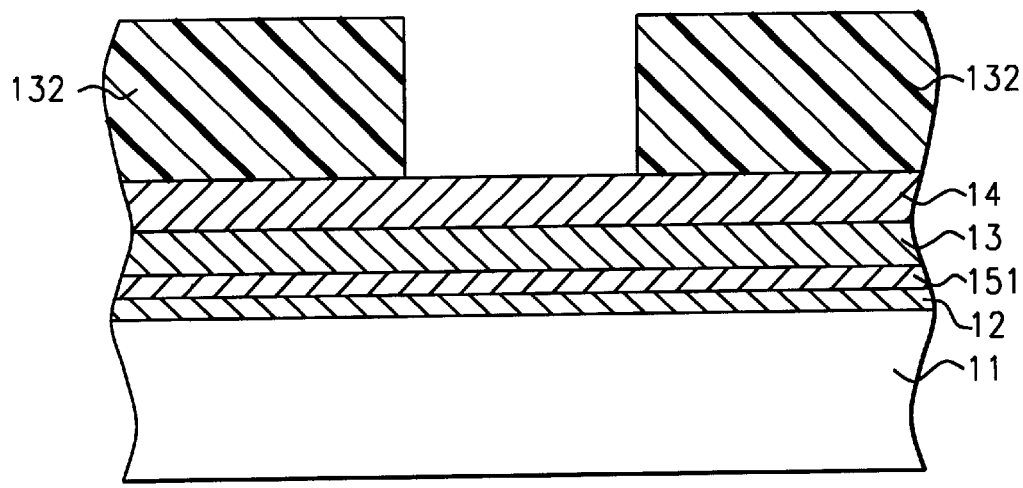
FIG. 8 illustrates the placement of a conventional photoresist mask on the surface the structure seen in FIG. 7.
Figure 9:
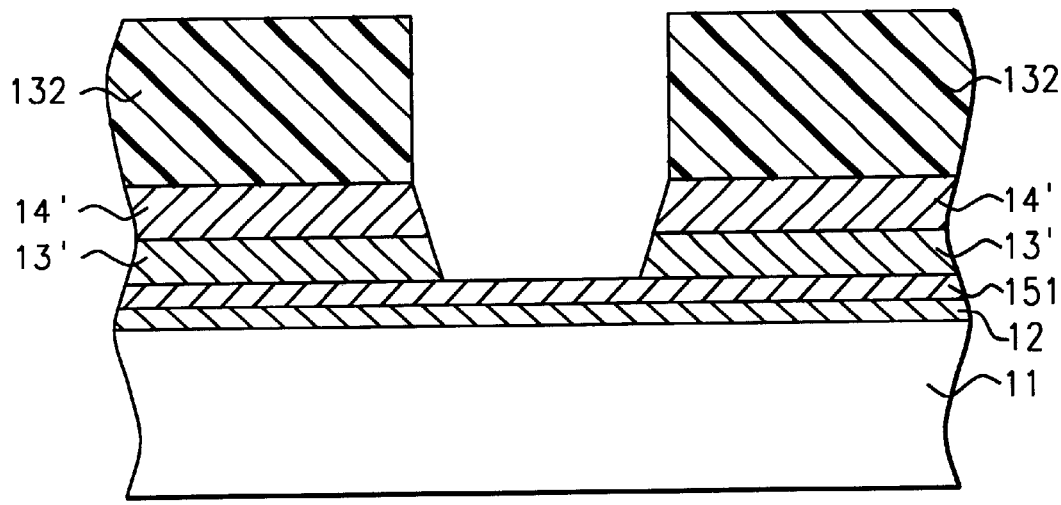
FIG. 9 illustrates the structure of FIG. 8 after etching to expose the protective layer.

Next, as seen in FIG. 8, a conventional photoresist mask 132 is formed on the longitudinal bias layer 14. With the mask in place, all areas of the longitudinal bias and buried lead layers that are not protected by mask 132 are removed, as shown in FIG. 9, leaving behind layers 13' and 14' and exposing protective layer 151.

The photoresist layer 132 is then removed using KOH developer. It is during this step that the presence of the protective layer is essential since, without it, oxidation of seed layer 12 is liable to occur.

Figure 10:
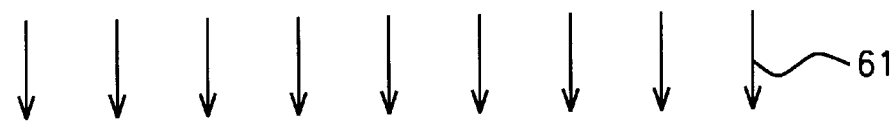
FIG. 10 shows the structure of FIG. 9 after sputter cleaning has been used to remove all or most of the exposed portions of the protective layer.
Figure 10:
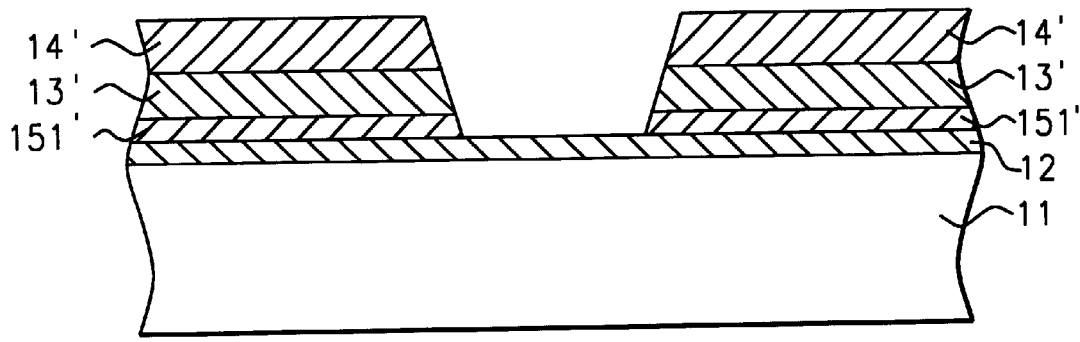

Following the removal of mask 132, the structure is subjected to sputter cleaning, symbolized by ion stream 61 in FIG. 10. Sputter cleaning may be carried on for long enough to completely remove the exposed portion of protective layer 151 or a small amount of it (less than about 30 Angstroms) may be left behind. If the latter option is chosen it is particularly important that protective layer 151 and seed layer 12 have similar crystal structures (lattice constants within ±0.5 Angstroms of each other).

The process of the second embodiment of the present invention essentially ends when the structure of FIG. 10 has been achieved. In practice, of course, processing would continue with the formation of a spin valve structure on the exposed seed layer in order to form the structure that was shown in FIG. 1.

A comparison was made, for both tantalum seeded and NiCr seeded structures, of the GMR ratios ($\Delta R/R$) of devices that were manufactured both with and without the protective layer step. The results are summarized in TABLE I below:

TABLE I

|  | Tantalum seeded | NiCr-seeded |
| --- | --- | --- |
| without protective layer | 4% | 2–3% |
| with protective layer | 5–6% | 8–9% |

This confirms that there is a significant improvement in performance of the structure when a protective layer step is added, particularly for NiCr seeded devices.

While the invention has been particularly shown and described with reference to the preferred embodiments thereof, it will be understood by those skilled in the art that various changes in form and details may be made without departing from the spirit and scope of the invention.

What is claimed is:

1. A process for manufacturing a spin valve structure, comprising the sequential steps of:

providing a substrate and depositing thereon a seed layer;

depositing a buried lead layer on the seed layer;

depositing a longitudinal bias layer on the buried lead layer;

on the longitudinal bias layer, forming a mask that comprises a lower portion, made of a soluble resin, and an upper portion, made of a photoresist material, that uniformly overlaps said lower portion;

removing, from areas not directly beneath the upper portion of the mask, all of the longitudinal bias and buried lead layers;

depositing a protective layer whereby all exposed portions of the seed layer get covered;

applying a solvent that dissolves said lower mask portion thereby causing liftoff of said mask together with all material adhering to the mask;

removing the protective layer by means of sputter cleaning, thereby exposing the seed layer; and on the exposed seed and longitudinal bias layers, forming a spin valve structure that is contacted by the buried leads.

2. The process of claim 1 wherein the seed layer is selected from the group consisting of tantalum, nickel-chromium, nickel-iron-chromium, and zirconium.

3. The process of claim 1 wherein the seed layer is deposited to a thickness between about 10 and 200 Angstroms.

4. The process of claim 1 wherein the protective layer is selected from the group consisting of copper, gold, platinum, silver, and palladium.

5. The process of claim 1 wherein the protective layer is deposited to a thickness between about 20 and 150 Angstroms.

6. The process of claim 1 wherein the protective layer has a sputtering yield that exceeds that of all material surrounding it.

7. The process of claim 1 wherein the protective layer forms an oxide that is readily soluble in ammonium persulfate.

8. The process of claim 1 wherein the protective layer has a crystal structure that is similar to that of the seed layer.

9. A process for manufacturing a spin valve structure, comprising the sequential steps of:

providing a substrate and depositing thereon a seed layer;

depositing a buried lead layer on the seed layer;

depositing a longitudinal bias layer on the buried lead layer; on the longitudinal bias layer, forming a mask that comprises a lower portion, made of a soluble resin, and an upper portion, made of a photoresist material, that uniformly overlaps said lower portion;

removing, from areas not directly beneath the upper portion of the mask, all of the longitudinal bias and buried lead layers;

depositing a protective layer whereby all exposed portions of the seed layer get covered;

applying a solvent that dissolves said lower mask portion thereby causing liftoff of said mask together with all material adhering to the mask;

by means of sputter cleaning, removing most of the protective layer whereby less than about 30 Angstroms remain on the seed layer; and on the remaining protective layer and on the longitudinal bias layers, forming a spin valve structure that is contacted by the buried leads.

10. The process of claim 9 wherein the protective layer has a crystal structure that is similar to that of the seed layer.

11. A process for manufacturing a spin valve structure, comprising the sequential steps of:

providing a substrate and depositing thereon a seed layer;

depositing a protective layer on the seed layer;

depositing a buried lead layer on the protective layer;

depositing a longitudinal bias layer on the buried lead layer;

on the longitudinal bias layer, patterning a layer of photoresist to form a mask;

removing, from areas not protected by the mask, all of the longitudinal bias and buried lead layers, while leaving the protective layer in place;

removing the layer of photoresist;

removing all exposed portions of the protective layer by means of sputter cleaning, thereby exposing the seed layer; and on the exposed seed and longitudinal bias layers, forming a spin valve structure that is contacted by the buried leads.

12. The process of claim 11 wherein the seed layer is selected from the group consisting of tantalum, nickel-chromium, nickel-iron-chromium, and zirconium.

13. The process of claim 11 wherein the seed layer is deposited to a thickness between about 10 and 200 Angstroms.

14. The process of claim 11 wherein the protective layer is selected from the group consisting of copper, gold, platinum, silver, and palladium.

15. The process of claim 11 wherein the protective layer is deposited to a thickness between about 20 and 150 Angstroms.

16. The process of claim 11 wherein the protective layer has a sputtering yield that exceeds that of all material surrounding it.

17. The process of claim 11 wherein the protective layer forms an oxide that is readily soluble in ammonium persulfate solution.

18. The process of claim 11 wherein the protective layer has a crystal structure that is similar to that of the seed layer.

19. A process for manufacturing a spin valve structure, comprising the sequential steps of:

providing a substrate and depositing thereon a seed layer;

depositing a protective layer on the seed layer;

depositing a buried lead layer on the protective layer;

depositing a longitudinal bias layer on the buried lead layer;

on the longitudinal bias layer, patterning a layer of photoresist to form a mask;

removing, from areas not protected by the mask, all of the longitudinal bias and buried lead layers, while leaving the protective layer in place;

removing the layer of photoresist, thereby exposing part of the protective layer;

by means of sputter cleaning, removing most of the exposed protective layer whereby less than about 30 Angstroms remain on the seed layer; and on the remaining protective layer and on the longitudinal bias layers, forming a spin valve structure that is contacted by the buried leads.

20. The process of claim 19 wherein the protective layer has a crystal structure that is similar to that of the seed layer.

* * * * *